No. 839,612. PATENTED DEC. 25, 1906.
R. D. MERSHON.
VARIABLE SPEED POLYPHASE MOTOR.
APPLICATION FILED SEPT. 23, 1903.
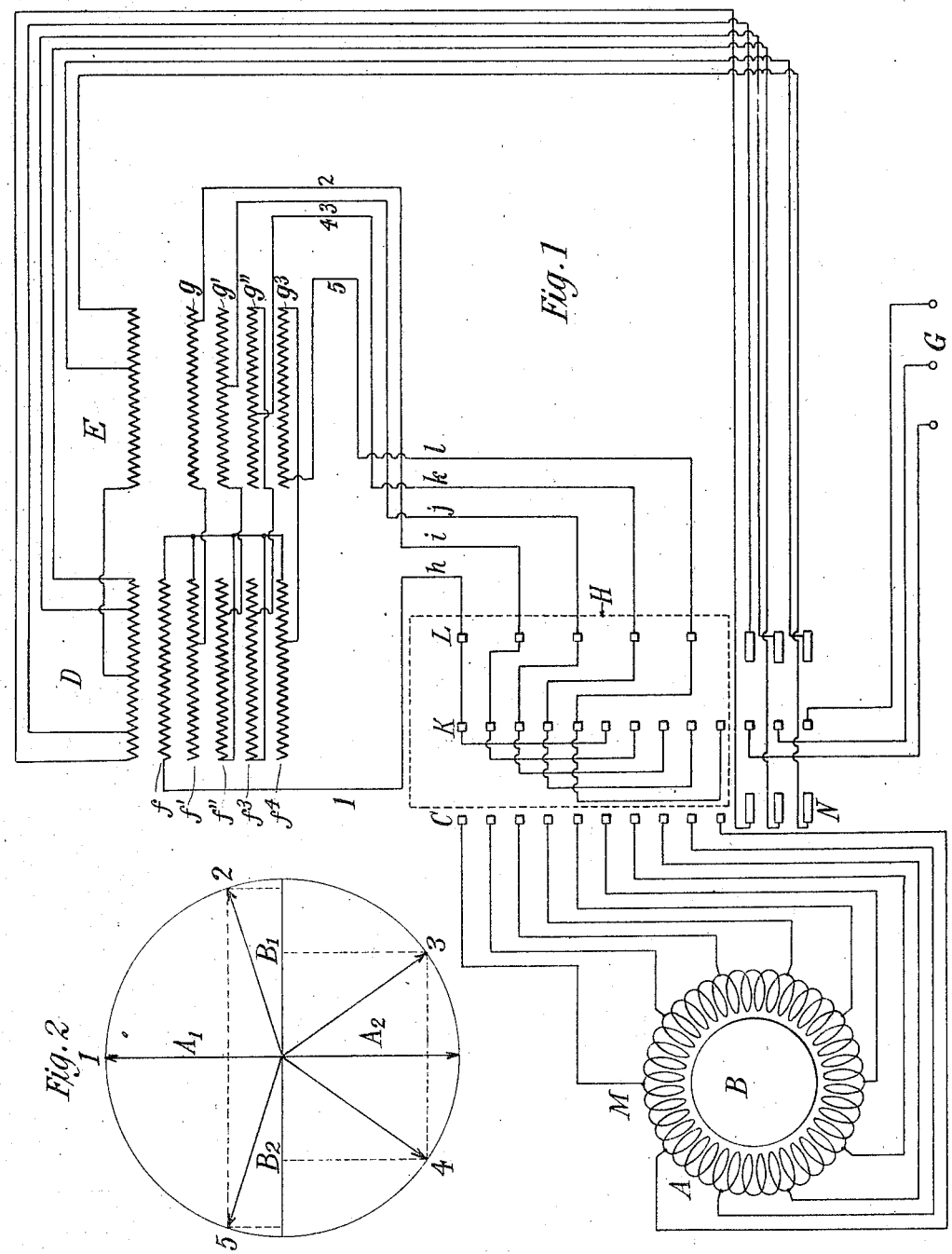
Witnesses:
Ralph D. Mershon, Inventor
by Kerr, Page & Cooper, Att'ys.

UNITED STATES PATENT OFFICE.

RALPH D. MERSHON, OF NEW YORK, N. Y.

VARIABLE-SPEED POLYPHASE MOTOR.

No. 839,612.

Specification of Letters Patent.

Patented Dec. 25, 1906.

Application filed September 23, 1903. Serial No. 174,274.

*To all whom it may concern:*

Be it known that I, RALPH D. MERSHON, a citizen of the United States, residing at New York, in the county and State of New York, have invented certain new and useful Improvements in Variable-Speed Polyphase Motors, of which the following is a specification, reference being had to the drawings accompanying and forming a part of the same.

My present invention relates to systems of power transmission by alternating currents, and has for its object to provide a practicable and efficient motor capable of running at varying speeds on a circuit supplying alternating currents of unvarying frequency. Inasmuch as such a motor has long been desired, it may be advantageous to examine briefly the present state of the art before explaining specifically the nature of my invention.

The chief obstacle, if not practically the only obstacle, to the use of alternating-current motors where direct-current machines are now employed is the fact that at present known to the art there is no method of varying the speed of an alternating-current motor which does not possess serious defects.

In operating railways, elevators, and other apparatus in which considerable variation of speed is necesssary or desirable the direct-current motor is now almost universally used, although in many other respects the alternating-current motor is preferable. A number of ways have been proposed and to some extent used for obtaining the capability of speed variation so much desired. One method is to use a rheostat in the secondary in the well-known manner. This secures the desired result, but with such a loss in the efficiency of the alternating-current motor as to render the plan objectionable. Another method, known as "concatenated control," is sometimes used where two or more motors are connected to the same load; but in this case a rheostat must be employed with at least one of the motors. Still another method is to vary the number of poles in the energizing-circuits, with corresponding change of speed; but as heretofore practiced the loss in efficiency by this method may be so great as to be prohibitive. Recourse must therefore generally be had to direct-current machines, although, as before stated, the alternating-current motor is in many other respects superior.

In some cases the necessity of using direct-current motors becomes particularly objectionable, as when power is to be transmitted over long distances, over a system of distribution many miles in extent, or from a distant water-power or other source. Under such conditions it is necessary to generate alternating current, transmit it at high tension to the point of utilization, and then by means of costly apparatus and attendance convert it into direct current. The power must be transmitted by alternating current, since with direct current the loss in transmission would be enormous unless the conductors were impracticably large or expensive. Having by means of the efficient and economical alternating apparatus delivered the power to the point where it is to be utilized, the current must then be rectified, with a resulting loss of a large proportion of the previous saving, merely because alternating-current motors do not possess that practical capability of speed control which is so indispensable.

To avoid the necessity and consequent expense of rectifying the current, a system has been proposed, particularly for use in connection with railways, in which the alternating current from the line energizes a motor on the locomotive or car, which in turn drives a generator also on the car. Current from the latter generator is then supplied to a second motor, also on the car, which in turn propels the vehicle. This plan has advantages for certain purposes; but at best it always requires three machines to do the work of one on each propelling-vehicle. A motor constructed and operated according to my invention, however, will be found to be capable of speed control as readily as a direct-current machine, without the defects of the latter, and to possess none of the objectionable features found in the previous methods of varying the speed of an alternating-current motor. At the same time the invention possesses numerous positive advantages. In the first place, since it is operated by alternating currents the use of rotary converters and their maintenance are dispensed with and the economy of alternating-current generation is therefore preserved. In long-distance transmission the only intermediate apparatus required is the transformer or transformers necessary to step down the voltage to the proper point. Again, no rheostat is used, and there is therefore no rheostatic loss when the motor is running at less than normal speed. For example, in bringing the motor and its load from rest to maximum speed or in running at any speed less than maximum there is no loss of power in the rheostat, and the motor at an intermediate speed, as well as at maximum, consumes approximately only so much power as is required to carry the load at that particular speed. A further advantage, and one of the most important, is the economy effected in stopping the load or bringing it from a higher to a lower speed. In such cases the inertia of the moving masses or, stated otherwise, the kinetic energy stored in the load, instead of being wasted in the brakes is transformed into electrical energy by the motor and is delivered to the supply-circuit to be utilized by other motors or translating devices connected therewith. This feature of the invention is of special value in traction systems where heavy trains with enormous inertia have to be brought from high speed to a stop. The potential energy of the load is also transformed into electrical energy and delivered to the line—as, for example, in the case of a train running downgrade. Here, as before, instead of applying the brakes to keep down or reduce the speed the motor itself receives the energy and returns it to the supply-circuit. Another instance which may be mentioned in this connection is a descending elevator-car. Here the potential energy, which is not inconsiderable, may be utilized to aid in raising other cars. In fact, it may be said generally that the motor will consume approximately only enough power to carry the load at the desired speed, whatever that may be, and that when from any cause the load itself is developing power the same may be transformed into useful energy and returned to the supply-circuit instead of being wasted, as is now commonly the case.

In order to utilize the principle of varying the number of poles to secure a variable speed in motors of the type referred to, and more especially in polyphase induction-motors or those having closed secondary windings, I have found it necessary to make special provisions for maintaining the field of approximately constant strength and in uniform rotation without regard to the number of poles.

In general practice, with the number of phases usually available from the ordinary sources of supply and when the speed of the motor is not to be varied, the condition of approximately constant strength and uniform rotation of the field of the latter is attained or approximated either by grouping the primary or field windings so that their distribution is not uniform or by winding the coils in the case of a drum-winding with a pitch greater or less than one hundred and eighty electrical degrees, so that their effect is that of a non-uniformly-distributed winding. All such windings I shall hereinafter designate as "non-uniformly distributed;" but a non-uniformly-distributed winding does not readily lend itself to the plan of varying the number of poles by varying the points of connection of each phase, since a distribution which suits one number of poles may not be at all suitable for another. For one number of poles such a winding may give a uniformly-rotating and approximately constant field, while for other numbers this result may not be obtained, and if the endeavor is made, as has been frequently the case, to rearrange by a commutator or controller the connections of the various coils of the winding simultaneously with the change in the points of connection of the phase the result is an objectionable complication, in addition to the fact that for low speeds, and therefore a great number of poles, the distribution of the winding will be less effective for uniformity of field, because the number of coils per pole is greatly reduced. My improvement, however, although in general applicable with the best results to a uniformly-distributed winding, applies also to one which is not uniform and overcomes the practical objections to the plan heretofore proposed, for while my improvement contemplates a greater number of main leads to the motor than in the case of a motor whose non-uniform winding is commutated, as above described, there is no commutation of the windings of the motor itself, but merely a change in the points of connection of the main leads to the motor, the result being greater simplicity both in the construction of the motor and in the means of making the required changes of connection. For convenience the invention will be described as applied to a uniformly-distributed winding and to a motor whose number of poles may be made either two or four. The same description, however, would apply if the windings of the motor be assumed to be non-uniform instead of uniform, as shown in the drawings.

In illustration of the principle of the invention let a uniformly-distributed winding having an infinite number of turns to which an infinite number of phases is supplied be assumed. The resulting field will be absolutely constant in value and uniformly rotating. In like manner if a large number of phases be supplied to a uniformly-distributed winding of a finite number of turns the resulting field will be approximately constant in value and uniform in rotation, the degree of approximation depending upon the number of phases employed. I therefore propose, primarily, to operate the motor by supplying to it a considerable number of phases; but as it would not be practicable to obtain these directly from the source of supply I propose to use in connection with the ordinary two or three phase supply-circuits a polyphase transformer or a plurality of single-phase transformers so disposed or whose windings are of such a character or so interconnected as to yield a number of phases as much in excess of that of the main or supply circuit as may be desired.

By using a large number of phases I obtain with a uniformly-distributed winding all the advantages of a non-uniformly-distributed winding without any of its objections, since for each number of poles which the special connections may produce I obtain all the advantages as regards uniformity of field that would be secured by a winding non-uniformly distributed with reference to each number of poles, and by supplying the greater number of phases to a non-uniformly-distributed winding I attain the result in carrying out my invention for which such winding is primarily employed—that is, for securing uniformity of field—and this without the drawbacks previously mentioned.

The methods of obtaining a number of phases different from that of the supply-circuit are various and well known. For example, by the interconnection of the two transformers four phases (quarter-phase) may be obtained from a three-phase source, or by three transformers not interconnected six phases may be obtained from a three-phase source. Again, by the use of two transformers with primaries interconnected to transform from three phase or two non-interconnected transformers transforming from two phase and in the cores of which, therefore, the fluxes will be in quadrature and winding upon their cores the requisite number of secondary coils of the proper number of turns it is possible by interconnecting the various secondaries of the two to obtain as many phases as desired and of any voltage desired. This follows from the general consideration that since the two transformers will yield electromotive forces ninety degrees apart and since any electromotive force may be resolved into two components along any two axes ninety degrees apart we may by combining two electromotive forces of the proper relative values, one of which is obtained from one of the transformers and the other from the other transformer, obtain electromotive force of any phase and any value desired.

The drawings hereto annexed illustrate diagrammatically in Figure 1 the arrangement of circuits and apparatus necessary for practicing my invention on the assumption that five phases will be supplied to the motor and that they will be obtained by compounding electromotive forces in quadrature. Fig. 2 is a vectorial diagram showing the amount and direction of the components which must be taken from each of the quadrature components to obtain any one of the five phases.

G indicates a source of polyphase current which is assumed in this case to be three-phase, and M an alternating-current motor of any suitable character—for example, one having a stationary element A, wound like a Gramme ring, and an ordinary closed-circuit or squirrel-cage armature B. From the windings of the ring A are taken the desired number of leads, which connect with terminals C.

D and E are two transformers the primaries of which are interconnected in the well-known manner indicated, so that when supplied with currents from a three-phase source the fluxes in the cores will differ by ninety degrees. Two transformers might be used the fluxes in whose cores are at some other angle than ninety degrees, provided the windings of the transformers were so proportioned and connected in the manner well known to those skilled in the art as to be adapted to the angle which exists between the fluxes.

The motor here shown is to be operated with either two or four poles, thus giving two speeds. It is supplied with five-phase currents through five leads $h$, $i$, $j$, $k$, and $l$ from the secondaries $f$ $f'$ $f''$ $f^3$ $f^4$ and $g$ $g'$ $g''$ $g^3$ of the transformers D and E. The derivation of five phases from the three supplied to the transformers will be more readily understood in connection with Fig. 2. The secondaries $f$ $f'$ $f''$ $f^3$ $f^4$ supply electromotive forces which may be considered as being those corresponding to $A_1$ and $A_2$ of the last-mentioned figure, since $A_1$ and $A_2$ differ by one hundred and eighty degrees and may therefore be obtained from the same transformer, but from separate secondaries whose connections are the reverse one of the other. Similarly, the coils $g$ $g'$ $g^2$ $g^3$ may be taken as corresponding to the electromotive forces $B_1$ $B_2$. It will be seen by following out the connections of the various secondaries that the quadrature components of electromotive force are combined in the manner and with the results indicated in Fig. 2. The secondary coils are all shown as having the same number of turns, a tap being taken off at the proper point to obtain the required value for the component of electromotive force, although in practice only so much of the coil as is required would be wound upon the core.

The relation between the transformer-diagram in Fig. 1 and the vectorial diagram of Fig. 2 having now been explained, the latter figure will be readily understood. Therein is shown the relation of the electromotive forces in quadrature—$A_1$ $A_2$ for one phase and $B_1$ $B_2$ for the other and the five phases 1 2 3 4 5, which are to be obtained from them. The diagram shows one of the numerous methods in which the quadrature electromotive forces may be obtained to obtain the five phases, and the electromotive-force parallelograms completed by the dotted lines indicate the amount and direction of the components which must be taken from each quadrature electromotive force to obtain any one of the five phases. For example, phase 1 is obtained directly from the electromotive force $A_1$ without composition. Phase 3 is obtained by taking a certain proportion, as shown in the diagram, of $B_1$ and $A_2$ and compounding them, and so on for the other phases.

As will be seen in Fig. 1, only five leads are brought from the interconnected secondaries; but different voltages can nevertheless be delivered by varying the primary connections, as will be readily understood. For this purpose a controller N is provided. (Diagrammatically illustrated in Fig. 1.) The lower voltage is used when the motor is run with the greater number of poles and the higher when run with the lower number. In general, it will usually be desirable to decrease the voltage as the number of poles is increased. Variation in voltage impressed upon the motor may also be accomplished by bringing out additional leads from the secondary coils instead of from the primaries, the different leads supplying the different voltages.

A controller of any suitable character may be employed in connection with the motor, and to it the various leads from the interconnected secondaries are brought. In illustration of this I have shown by projection in the flat a cylinder of insulating material H, bearing two rows of contacts or terminals K L. It is assumed that by turning the cylinder H either row of contacts is brought under the series of brushes or contacts C, and by following the connections it will be seen that when contacts C bear upon contacts K the motor will be supplied at the number of points requisite for producing four poles. On the other hand, when contacts C and L are brought together and the former connections broken the motor will be supplied at the number of points which will produce two poles.

The construction of the controller may ordinarily be greatly varied and either set of contacts made movable while the other is fixed, or both may be fixed and ordinary devices for bridging them employed. It is also obvious from a consideration of the principle upon which the invention is based that a greater number of phases may be obtained and employed in the manner described, it being understood in all cases that the practical requirements of obtaining them by means such as hereinbefore set forth be complied with.

The means for securing an approximately uniform rotating field is herein shown applied in connection with means for varying the number of poles to produce change of speed; but it should be understood that the same method may be employed in a motor having an invariable number of poles, and which is therefore a constant-speed motor, for the purpose of securing with a uniformly-distributed winding the advantages of a winding which is non-uniformly distributed.

The saving of power in starting, stopping, or retarding the load which is secured by the use of my invention will be easily seen. In starting from rest or in coming to a higher speed from a lower the speed rises as the number of poles is decreased, and since the motor will for each number of poles take approximately only enough power to bring its speed to synchronism the power consumed at the lower synchronous speeds is less than that required when running at full or normal speed. So in retarding the load if when running at a higher speed the number of poles be increased the motor, driven by the inertia of the load at a rate above synchronism for the new number of poles, will act as a generator and deliver current to the line until the speed has been reduced to synchronism. Similarly the potential energy of the load may be utilized to drive the motor as a generator, and so return power to the supply-circuit.

The method herein disclosed I do not claim in this application, but do so broadly in my copending application, filed December 3, 1906.

Having now described my invention, what I claim is—

1. In a system of power transmission, the combination with a polyphase source, of a motor, having leads for a number of phases greater than that of the supply-circuit, one or more transformers intermediate to the supply-circuit and motor, and arranged to produce phases of the number required for the motor and of different voltages, and means for connecting the transformer with the motor-circuits at points to produce different numbers of poles in the motor, as set forth.

2. In a system of power transmission, the combination with a polyphase source, of a motor having leads for a number of phases greater than that of the supply-circuit and for as great a number of pairs of poles as correspond to the lowest speed at which the motor is to be operated, one or more transformers intermediate to the supply-circuit and motor, and arranged to produce phases of the number required for the motor and of the requisite different voltages, and means for connecting the transformer with the motor-circuits in different orders according to the number of poles and voltage desired, as set forth.

3. In a system of power transmission, the combination with a polyphase source, of a motor having leads from its winding for a number of phases greater than that of the supply-circuits, and for as great a number of poles as corresponds to the lowest speed at which the motor is to be operated, one or more transformers intermediate to the supply-circuit and motor and disposed or interconnected so as to produce phases of the number required by the motor and of voltages proper for the operation of the motor with different numbers of pairs of poles, and a controller for changing the order of connections between the motor and transformer-leads whereby the motor may be run with different numbers of pairs of poles from transformer-leads of voltages proper for such numbers, as set forth.

4. In a system of power transmission, the combination with a polyphase source, of an induction-motor, having leads for a number of phases greater than that of the supply-circuit, one or more transformers intermediate to the supply-circuit and motors, and arranged to produce phases of the number required for the motor and of different voltages, and means for connecting the transformer with the motor-circuits at points to produce different numbers of poles in the motor, as set forth.

5. In a system of power transmission, the combination with a polyphase source, an induction-motor having leads for a number of phases greater than that of the supply-circuit and for as great a number of pairs of poles as correspond to the lowest speed at which the motor is to be operated, one or more transformers intermediate to the supply-circuit and motor, and arranged to produce phases of the number required for the motor and of the requisite different voltages, and means for connecting the transformer with the motor-circuits in different orders according to the number of poles and voltage desired, as set forth.

6. In a system of power transmission, the combination with a polyphase source, of an induction-motor having leads from its winding for a number of phases greater than that of the supply-circuits, and for as great a number of poles as corresponds to the lowest speed at which the motor is to be operated, one or more transformers intermediate to the supply-circuit and motor and disposed or interconnected so as to produce phases of the number required by the motor and of voltages proper for the operation of the motor with different numbers of pairs of poles, and a controller for changing the order of connections between the motor and transformer-leads whereby the motor may be run with different numbers of pairs of poles from transformer-leads of voltages proper for such numbers, as set forth.

7. In a system of power transmission, the combination with a polyphase source, of a uniformly-wound motor, having leads for a number of phases greater than that of the supply-circuit, one or more transformers intermediate to the supply-circuit and motors, and arranged to produce phases of the number required for the motor and of different voltages, and means for connecting the transformer with the motor-circuits at points to produce different numbers of poles in the motor, as set forth.

8. In a system of power transmission, the combination with a polyphase source, of a uniformly-wound motor having leads for a number of phases greater than that of the supply-circuit and for as great a number of pairs of poles as correspond to the lowest speed at which the motor is to be operated, one or more transformers intermediate to the supply-circuit and motor, and arranged to produce phases of the number required for the motor and of the requisite different voltages, and means for connecting the transformer with the motor-circuits in different orders according to the number of poles and voltage desired, as set forth.

9. In a system of power transmission, the combination with a polyphase source, of a uniformly-wound motor having leads from its winding for a number of phases greater than that of the supply-circuits, and for as great a number of poles as corresponds to the lowest speed at which the motor is to be operated, one or more transformers intermediate to the supply-circuit and motor and disposed or interconnected so as to produce phases of the number required by the motor and of voltages proper for the operation of the motor with different numbers of pairs of poles, and a controller for changing the order of connections between the motor and transformer-leads whereby the motor may be run with different numbers of pairs of poles from transformer-leads of voltages proper for such numbers, as set forth.

10. In a system of power transmission, the combination with a polyphase source, of a uniformly-wound induction-motor, having leads for a number of phases greater than that of the supply-circuit, one or more transformers intermediate to the supply-circuit and motors, and arranged to produce phases of the number required for the motor and of different voltages, and means for connecting the transformer with the motor-circuits at points to produce different numbers of poles in the motor, as set forth.

11. In a system of power transmission, the combination with a polyphase source, a uniformly-wound induction-motor having leads for a number of phases greater than that of the supply-circuit and for as great a number of pairs of poles as correspond to the lowest speed at which the motor is to be operated, one or more transformers intermediate to the supply-circuit and motor, and arranged to produce phases of the number required for the motor and of the requisite different voltages, and means for connecting the transformer with the motor-circuits in different orders according to the number of poles and voltage desired, as set forth.

12. In a system of power transmission, the combination with a polyphase source, of a uniformly-wound induction-motor having leads from its winding for a number of phases greater than that of the supply-circuits, and for as great a number of poles as corresponds to the lowest speed at which the motor is to be operated, one or more transformers intermediate to the supply-circuit and motor and disposed or interconnected so as to produce phases of the number required by the motor and of voltages proper for the operation of the motor with different numbers of pairs of poles, and a controller for changing the order of connections between the motor and transformer-leads whereby the motor may be run with different numbers of pairs of poles from transformer-leads of voltages proper for such numbers as set forth.

13. In a system of power transmission, the combination of an alternating-current motor, leads thereto for a number of phases sufficient to give an approximately uniform rotating field with a uniform winding, and means for varying the number of poles without varying the number of phases, as set forth.

14. In a system of power transmission, the combination of an alternating-current motor, leads for a number of phases sufficient to give an approximately uniform rotating field with a uniform winding, leads for operating with different numbers of poles, and means for varying the connections to alter the number of poles without altering the number of phases, as set forth.

15. In a system of power transmission, the combination of a source of polyphase alternating currents, line-wires transmitting the same, a motor having leads for a larger number of phases than could be transmitted by the number of line-wires from the generator, transformers between the generator and motor, and connections from the motor for varying the number of poles without varying the number of phases, as set forth.

16. In a system of power transmission, the combination of an alternating-current induction-motor having a uniform primary winding, groups of leads for giving different numbers of poles, each group having a number of leads to receive a number of phases which will give a practically uniform rotating field, and means for changing the connections of the leads to a supply-circuit to increase or decrease the number of poles for decreasing or increasing the speed of the motor, as set forth.

RALPH D. MERSHON.

Witnesses:
S. S. DUNHAM,
M. LAWSON DYER.